United States Patent
Atreya et al.

(10) Patent No.: US 10,299,202 B2
(45) Date of Patent: May 21, 2019

(54) ELASTIC WIRELESS CONTROL PLANE

(71) Applicant: Extreme Networks, Inc., San Jose, CA (US)

(72) Inventors: Vivek L Atreya, Bangalore (IN); Shashi Hosakere Ankaiah, Bangalore (IN); M.S Badari Narayana, Santa Clara, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 15/169,661

(22) Filed: May 31, 2016

(65) Prior Publication Data

US 2017/0135034 A1 May 11, 2017

Related U.S. Application Data

(63) Continuation of application No. 14/077,095, filed on Nov. 11, 2013, now Pat. No. 9,357,484.

(51) Int. Cl.
| | |
|---|---|
| *H04W 52/02* | (2009.01) |
| *H04W 24/08* | (2009.01) |
| *H04W 88/12* | (2009.01) |
| *H04W 84/12* | (2009.01) |

(52) U.S. Cl.
CPC ....... *H04W 52/0206* (2013.01); *H04W 24/08* (2013.01); *H04W 84/12* (2013.01); *H04W 88/12* (2013.01); *Y02D 70/00* (2018.01); *Y02D 70/142* (2018.01)

(58) Field of Classification Search
CPC combination set(s) only.
See application file for complete search history.

(56) References Cited

U.S. PATENT DOCUMENTS

| | | | | |
|---|---|---|---|---|
| 9,357,482 | B2 * | 5/2016 | Khawer | H04W 52/0206 |
| 9,357,484 | B2 * | 5/2016 | Atreya | H04W 52/0206 |
| 9,571,338 | B2 * | 2/2017 | Kamble | H04L 41/08 |
| 9,705,704 | B2 * | 7/2017 | So | H04L 12/4641 |
| 2007/0127417 | A1 | 6/2007 | Kalika | |
| 2009/0059800 | A1 * | 3/2009 | Mohan | H04L 12/462 370/241.1 |
| 2010/0290396 | A1 | 11/2010 | Karunakaran | |
| 2010/0290446 | A1 | 11/2010 | Atreya | |
| 2010/0323683 | A1 | 12/2010 | Kazmi | |
| 2013/0064180 | A1 | 3/2013 | Bergman | |
| 2013/0122913 | A1 * | 5/2013 | Agarwal | H04W 24/02 455/439 |
| 2014/0362688 | A1 | 12/2014 | Zhang | |
| 2015/0009874 | A1 | 1/2015 | Edara | |
| 2015/0373672 | A1 | 12/2015 | Forssell | |

\* cited by examiner

*Primary Examiner* — Jason E Mattis
(74) *Attorney, Agent, or Firm* — Sterne, Kessler, Goldstein & Fox P.L.L.C.

(57) ABSTRACT

One or more implementations can include methods, systems and computer readable media for elastic wireless control planes. In some implementations, the method can include evaluating one or more elastic wireless control plane mode factors, and partitioning each of a plurality of access points into one of an active mode group and a sleep mode group based on the evaluating. The method can also include determining a number of wireless control plane instances needed based on the partitioning. The method can further include activating the number of wireless control plane instances and shutting down any excess wireless control plane instances beyond the number.

20 Claims, 3 Drawing Sheets

ELASTIC WIRELESS CONTROL PLANE

TECHNICAL FIELD

Embodiments relate generally to computer networks, and more particularly, to methods, systems and computer readable media for elastic wireless control planes.

BACKGROUND

In some networks, access points (APs) may be wireless control plane (WCP) managed devices. Traditionally, WCP functionality has co-existed with the wireless switching plane (WSP) on a wireless controller (WC). In this model, client data is tunneled by the APs to the WC, which then switches the data. With WLAN becoming one of the main access mediums and with the advent of high-speed wireless access (e.g., 802.11n and 802.11ac), the WC may become a bottleneck.

In order to compensate for the WC bottleneck, architectures have been developed in which the WCP is separated from the WSP. In this way, the WCP and WSP can scale independently. The WSP functionality has been embedded into switches and APs.

Also, the WCP functionality is increasingly provided as a virtual appliance or virtual machine (VM). The WCP-VM instances can be executed on private or public clouds by customers or users. These WCP instances manage the switches and the APs deployed inside the enterprise to provide WLAN functionality.

There may be some limitations with conventional approaches to virtual WCPs. For example, the number of instances and specifications of each WCP-VM instance may depend on the number of APs and the number of clients (peak) that need to be supported. For example, to support 2000 APs and 10,000 client devices, 8 to 10 WCP VM instances would be needed.

In some deployments, such as enterprises and schools, the peak load may exist only for certain hours during the day (e.g., during the daytime for approximately 10-12 hours). During the other hours, the load on the WCPs in these deployments may be minimal to none.

Conventional WCPs may not differentiate between idle and peal times. For example, conventional systems may operate the same number of instances (with the same specifications) during idle and peak times. Further, the APs may keep sending status and statistics reports and keep-alive signals to the WCP, which remains active to process these messages.

The above-mentioned problems and limitations with some conventional WCP VM systems can lead to increased or wasteful costs (e.g., by paying for unnecessary cloud hosting time for VM instances that are idle) and increased or wasteful power usage (e.g., due to the same number of WCPs running all the time regardless of the load on the network).

Embodiments were conceived in light of the above mentioned needs, problems and/or limitations, among other things.

SUMMARY

One or more embodiments can include methods, systems and computer readable media for elastic wireless control planes. In some implementations, the method can include evaluating one or more elastic wireless control plane mode factors, and partitioning each of a plurality of access points into one of an active mode group and a sleep mode group based on the evaluating. The method can also include determining a number of wireless control plane instances needed based on the partitioning. The method can further include activating the number of wireless control plane instances and shutting down any excess wireless control plane instances beyond the number.

The method can also include repeating the evaluating, partitioning, determining and activating periodically. The method can further include repeating the evaluating, partitioning, determining and activating according to a schedule. The method can also include repeating the evaluating, partitioning, determining and activating in response to a change in demand of network resources. The method can further include downloading a sleep mode plan to the access points in the sleep mode group, the sleep mode plan including longer timeouts for a first group of periodic activities as compared to the active mode group and stopping a second group of periodic activities.

The partitioning can include hysteresis. The evaluating can include evaluating a time of day. The evaluating can include monitoring a network over time to determine usage patterns.

Some implementations can include a system comprising one or more processors configured to perform operations. The operations can include evaluating one or more elastic wireless control plane mode factors. The operations can also include partitioning each of a plurality of access points into one of an active mode group and a sleep mode group based on the evaluating. The operations can further include determining a number of wireless control plane instances needed based on the partitioning. The operations can also include activating the number of wireless control plane instances and shutting down any excess wireless control plane instances beyond the number.

The operations can further include repeating the evaluating, partitioning, determining and activating periodically. The operations can also include repeating the evaluating, partitioning, determining and activating according to a schedule. The operations can also include repeating the evaluating, partitioning, determining and activating in response to a change in demand of network resources.

The partitioning can include hysteresis. The evaluating can include evaluating a time of day. The evaluating can include monitoring a network over time to determine usage patterns.

Some implementations can include a nontransitory computer readable medium having stored thereon software instructions that, when executed by a processor of a wireless controller, cause the processor to perform operations. The operations can include evaluating one or more elastic wireless control plane mode factors. The operations can also include partitioning each of a plurality of access points into one of an active mode group and a sleep mode group based on the evaluating. The operations can further include determining a number of wireless control plane instances needed based on the partitioning. The operations can also include activating the number of wireless control plane instances and shutting down any excess wireless control plane instances beyond the number.

The operations can further include repeating the evaluating, partitioning, determining and activating periodically. The operations can also include repeating the evaluating, partitioning, determining and activating according to a schedule. The operations can also include repeating the evaluating, partitioning, determining and activating in response to a change in demand of network resources.

The partitioning can include hysteresis. The evaluating can include evaluating a time of day. The evaluating can include monitoring a network over time to determine usage patterns.

DETAILED DESCRIPTION

Figure 1:
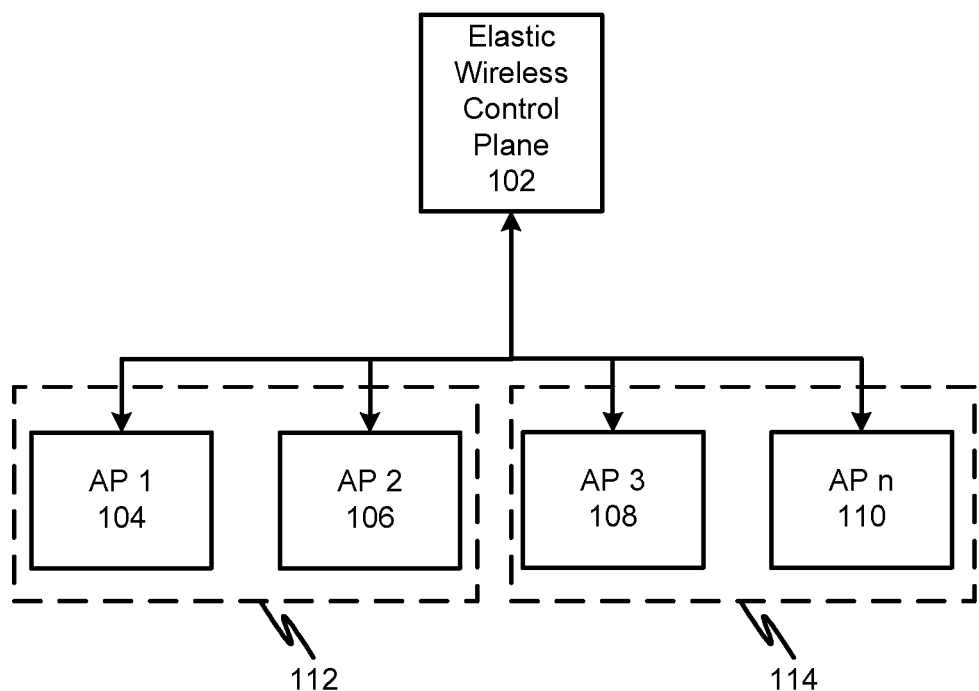
FIG. 1 is a diagram of an example elastic wireless control plane network in accordance with at least one implementation.

In general, some implementations can include a wireless control plane that is elastic (e.g., one which expands and contracts based on client load in the WLAN network). The WCP VM instances servicing a network together form a cluster called the mobility domain. One of the instances can be elected as the "leader" and is referred to as the domain controller. To achieve the disclosed elasticity of the WCP, there are two modes of operations for APs in the network: active mode and sleep mode.

Active mode includes those APs that are those that are active during busy periods (e.g., school hours or office hours), have a client count above a set threshold during a non-busy period, or the like. The active mode APs generate more control/status traffic relative to a sleep mode AP and also generate periodic statistics and RF scan reports, for example.

Sleep mode APs may be active during a non-busy period and may have a client count less than a certain threshold during the non-busy period. Sleep mode APs generate less control/status traffic and may not participate in background management tasks such as RF scans.

The domain controller can continuously evaluate the load in the network (e.g., factors such as number of connected clients, mobility of connected clients, amount and type of data being exchanged or the like) to determine when to start the sleep mode process. The decision to enter the sleep mode process can also be influenced by administrator configuration (e.g., day of week, time of day, or the like). Alternatively, the WCP can learn the "time of day" usage patterns by studying the network over time. The decision to enter sleep mode can include one or more of the above.

Once the domain controller has indicated that sleep mode has started, a WCP (domain controller or other WCP) can scan through the list of APs in its domain and determine which, if any, of the APs can be moved to sleep mode. An AP can be a good candidate for sleep mode if it has a client count below a set threshold. The threshold can include a factory set default value, which can be modified by an administrator, for example.

Once an AP is marked for sleep mode, the domain controller can notify the AP about the plan change and the plan data. APs in sleep mode can adopt longer timeouts (as indicated by the plan data) for periodic activities such as RF channel scans, neighbor client reports, statistic reports and keep-alive signals. The plan may also ask the AP to stop certain periodic activities. The reduction in periodic activities can result in a smaller load on the WCP and reduced traffic in the network.

Based on the number of APs in sleep mode, the domain controller can determine a minimum number of WCP instances needed to service the APs. The WCP instances can then be partitioned into two sets: active and shutdown. The WCP instances in the active set will continue to operate, which the WCP instances in the shutdown set can be shutdown (or halted).

The WCP can then request the APs to move their control channel to the active set of WCPs. Once APs confirm their move to the active set, the domain controller can shut down the instances in the shutdown set.

When clients start to associate, the client load starts to go up in the network. The domain controller can respond by moving APs back from the sleep mode to the active mode. As the number of APs in the active mode goes up, the domain controller can determine if additional instances of the WCP VM need to be started and any necessary additional instances can be started on demand.

Hysteresis can be used in the domain controller on the sleep mode transition and/or the active mode transition to prevent APs from "flip-flopping" back and forth rapidly between active and sleep modes.

By providing an elastic wireless control plane, hosting costs for the WCP VM and energy consumption can be reduced. WCP VM instances can be started or stopped based on time of day. Also, the WCP VM instances can be scaled up to meet demand during days with irregular peak traffic (e.g., companywide meetings, vendor fairs or the like).

FIG. 1 shows an example network 100 having elastic wireless control planes. The network includes an elastic wireless control plane ("WCP") 102 and a plurality of APs (104-110). The WCP 102 can include one or more WCP VM instances with one of the WCP VM instances being elected as the domain controller. The APs 104-110 can be partitioned into two groups: an active mode group 112 and a sleep mode group 114. The elastic WCP 102 can operate according to the method described above and below in connection with FIG. 2.

Figure 2:
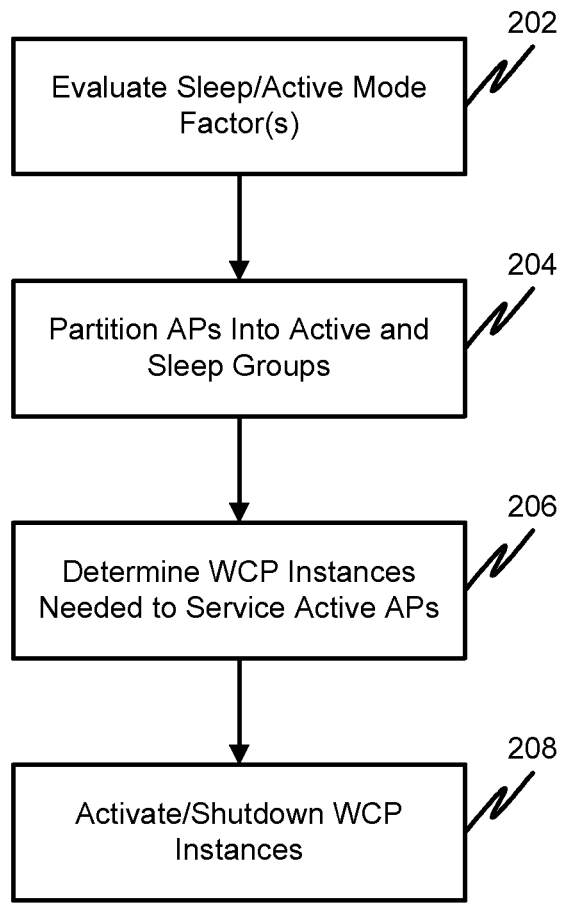
FIG. 2 is a flow chart of an example method for elastic wireless control planes in accordance with at least one implementation.

FIG. 2 shows a flow chart for an example method for elastic wireless control planes. Processing begins at 202, where elastic wireless control plane sleep/active mode factors are evaluated. The factors can include those described above. Processing continues to 204.

At 204, the APs can be partitioned into active and sleep mode groups. For example, the domain controller can partition the APs into the active group and the sleep group. Processing continues to 206.

At 206, the number of WCP VM instances is determined based on the partitioning at 204. The WCP instances can be placed into active or shutdown states, as described above. Processing continues to 208.

At 208, the WCP instances can be activated or shutdown according to the determination at 206.

It will be appreciated that 202-208 can be performed continuously, periodically, at set times, and/or on demand, and can be performed in whole or in part in order to accomplish a contemplated elastic wireless control plane function.

Figure 3:
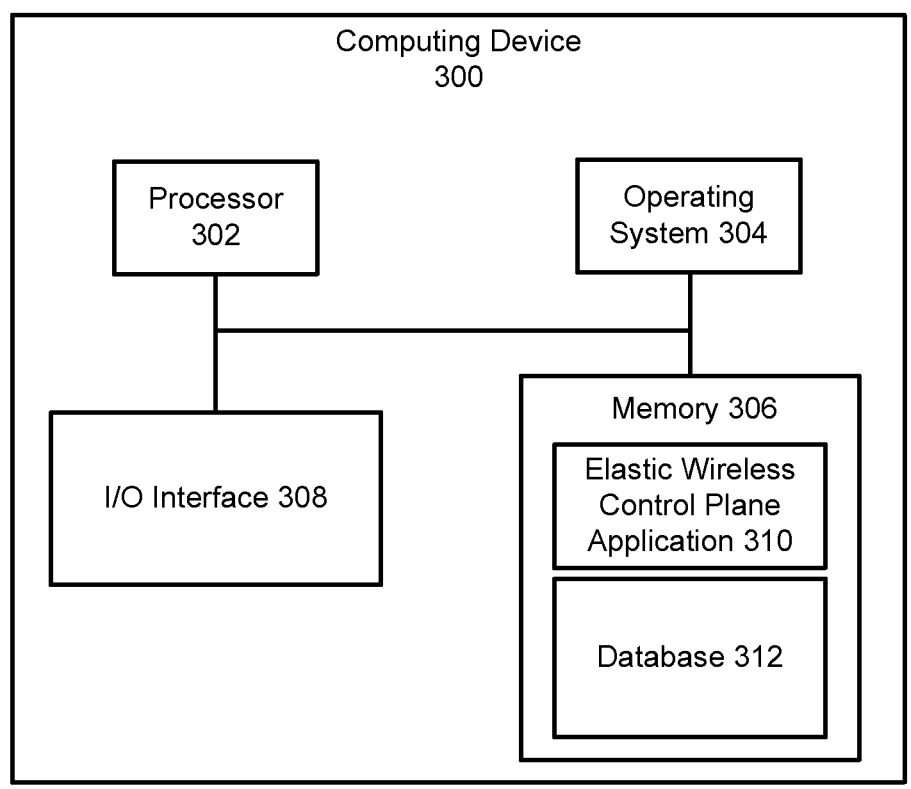
FIG. 3 is a diagram of an example computer system for elastic wireless control planes in accordance with at least one implementation.

FIG. 3 is a diagram of an example computer system 300 in accordance with at least one implementation. The computer 300 includes a processor 302, operating system 304, memory 306 and I/O interface 308. The memory 306 can include an elastic wireless control plane application 310 and a database 312 (e.g., for storing active/sleep mode parameters or the like).

In operation, the processor 302 may execute the application 310 stored in the memory 306. The application 310 can include software instructions that, when executed by the processor, cause the processor to perform operations for elastic wireless control planes in accordance with the present disclosure (e.g., performing one or more of steps 202-208).

The application program 310 can operate in conjunction with the database 312 and the operating system 304.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, the C#.NET framework, assembly or the like. The instructions can also comprise code and data objects provided in accordance with, for example, the Visual Basic™ language, or another structured, object-oriented, imperative or declarative programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for elastic wireless control planes.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   evaluating one or more elastic wireless control plane mode factors;
   partitioning each of a plurality of access points into one of an active mode group and a sleep mode group based on the evaluating;
   determining a number of wireless control plane instances needed based on a number of access points in the active mode group; and
   activating the number of wireless control plane instances and shutting down any excess wireless control plane instances beyond the number of wireless control plane instances.

2. The method of claim 1, further comprising:
   repeating the evaluating, partitioning, determining and activating periodically or according to a schedule.

3. The method of claim 1, further comprising:
   repeating the evaluating, partitioning, determining and activating in response to a change in demand of network resources.

4. The method of claim 1, further comprising:
   downloading a sleep mode plan to the access points in the sleep mode group, the sleep mode plan including longer timeouts for a first group of periodic activities as compared to the active mode group and stopping a second group of periodic activities.

5. The method of claim 1, wherein the evaluating includes evaluating a time of day.

6. The method of claim 1, wherein the evaluating includes monitoring a network over time to determine usage patterns.

7. The method of claim 1, wherein determining the number of wireless control plane instances needed based on the number of access points in the active mode group comprises: determining a number of wireless control plane virtual machines needed based on the number of access points in the active mode group.

8. A system comprising one or more processors configured to perform operations including:
evaluating one or more elastic wireless control plane mode factors;
partitioning each of a plurality of access points into one of an active mode group and a sleep mode group based on the evaluating;
determining a number of wireless control plane instances needed based on a number of access points in the active mode group; and
activating the number of wireless control plane instances and shutting down any excess wireless control plane instances beyond the number of wireless control plane instances.

9. The system of claim 8, wherein the operations further comprise:
repeating the evaluating, partitioning, determining and activating periodically or according to a schedule.

10. The system of claim 8, wherein the operations further comprise: repeating the evaluating, partitioning, determining and activating in response to a change in demand of network resources.

11. The system of claim 8, wherein the operations further comprise:
downloading a sleep mode plan to the access points in the sleep mode group, the sleep mode plan including longer timeouts for a first group of periodic activities as compared to the active mode group and stopping a second group of periodic activities.

12. The system of claim 8, wherein the evaluating includes evaluating a time of day.

13. The system of claim 8, wherein the evaluating includes monitoring a network over time to determine usage patterns.

14. The system of claim 8, wherein the one or more processors, when performing the operation of determining the number of wireless control plane instances needed based on the number of access points in the active mode group, are configured to determine a number of wireless control plane virtual machines needed based on the number of access points in the active mode group.

15. A non-transitory computer-readable medium having stored thereon software instructions that, when executed by a processor of a wireless controller, cause the processor to perform operations including:
evaluating one or more elastic wireless control plane mode factors;
partitioning each of a plurality of access points into one of an active mode group and a sleep mode group based on the evaluating;
determining a number of wireless control plane instances needed based on a number of access points in the active mode group; and
activating the number of wireless control plane instances and shutting down any excess wireless control plane instances beyond the number of wireless control plane instances.

16. The non-transitory computer-readable medium of claim 15, wherein the operations further comprise:
repeating the evaluating, partitioning, determining and activating periodically or according to a schedule.

17. The non-transitory computer-readable medium of claim 15, wherein the operations further comprise:
repeating the evaluating, partitioning, determining and activating in response to a change in demand of network resources.

18. The non-transitory computer-readable medium of claim 15, wherein the partitioning includes hysteresis.

19. The non-transitory computer-readable medium of claim 15, wherein the evaluating includes evaluating a time of day, and wherein the evaluating includes monitoring a network over time to determine usage patterns.

20. The non-transitory computer-readable medium of claim 15, wherein the software instructions cause the processor, when determining the number of wireless control plane instances needed based on the number of access points in the active mode group, to determine a number of wireless control plane virtual machines needed based on the number of access points in the active mode group.

\* \* \* \* \*